(12) United States Patent
Okuno

(10) Patent No.: US 9,250,362 B2
(45) Date of Patent: Feb. 2, 2016

(54) OPTICAL SYSTEM, BARREL, AND OPTICAL INSTRUMENT USING

(75) Inventor: Takeharu Okuno, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 770 days.

(21) Appl. No.: 13/454,148

(22) Filed: Apr. 24, 2012

(65) Prior Publication Data

US 2012/0275027 A1   Nov. 1, 2012

(30) Foreign Application Priority Data

Apr. 26, 2011   (JP) ................................. 2011-097767

(51) Int. Cl.
*G02B 7/02* (2006.01)
*G02B 1/115* (2015.01)
*G02B 1/118* (2015.01)

(52) U.S. Cl.
CPC ................ *G02B 1/115* (2013.01); *G02B 1/118* (2013.01); *G02B 7/025* (2013.01); *G02B 2207/107* (2013.01)

(58) Field of Classification Search
CPC ............ G02B 1/118; G02B 1/11; G02B 3/00; G02B 3/0075; G02B 7/022; G02B 7/00; G02B 7/025
See application file for complete search history.

(56) References Cited

U.S. PATENT DOCUMENTS

| 6,356,376 | B1 * | 3/2002 | Tonar et al. .................... 359/267 |
| 6,660,326 | B2 * | 12/2003 | Sano et al. ..................... 427/180 |
| 8,559,112 | B2 | 10/2013 | Okuno |
| 2008/0181601 | A1 * | 7/2008 | Shintani ........................ 396/529 |
| 2011/0019283 | A1 * | 1/2011 | Steenblik et al. ............. 359/622 |
| 2012/0147489 | A1 * | 6/2012 | Matsuoka ..................... 359/819 |

FOREIGN PATENT DOCUMENTS

| JP | 0657103 | A | 3/1994 |
| JP | 08244129 | A | 9/1996 |
| JP | 11344657 | A | 12/1999 |
| JP | 2005010657 | A | 1/2005 |
| JP | 2005-157119 | A | 6/2005 |
| JP | 2009047820 | A | 3/2009 |
| JP | 2009244865 | A | 10/2009 |
| JP | 2010191074 | A | 9/2010 |
| JP | 2010204403 | A | 9/2010 |
| WO | WO 2011024387 | A1 * | 3/2011 |

OTHER PUBLICATIONS

Official Action issued in JP2011-097767, mailed Feb. 3, 2015. English translation provided.

* cited by examiner

*Primary Examiner* — Derek S Chapel
(74) *Attorney, Agent, or Firm* — Rossi, Kimms & McDowell LLP

(57) ABSTRACT

Provided is an optical system having at least two or more lenses, wherein at least one of the lenses comprises an anti-reflection film formed by a wetting method on a part of or the entirety of the light beam effective surface thereof, and wherein at least one of the lenses other than the lens comprising the anti-reflection film is fixed to the space between the lens and a barrel for holding the lens via an energy-curable resin to be filled therein.

14 Claims, 4 Drawing Sheets

OPTICAL SYSTEM, BARREL, AND OPTICAL INSTRUMENT USING

BACKGROUND OF THE INVENTION

1. Field of the Invention

The present invention relates to an optical system, a barrel, and optical instrument using the same.

2. Description of the Related Art

Conventionally, for an optical element such as a lens or a prism for use in an imaging apparatus such as a camera or the like, an anti-reflection film for preventing the loss of the intensity of incident light or the occurrence of unwanted light such as flares or ghost due to reflected light is installed on the optical surface thereof. For example, for a camera lens, a multilayer film configured by stacking dielectric thin films (typically called "multi-coating") is employed as an anti-reflection film. In the multilayer film, thin films having different refractive indices and having appropriate thicknesses are stacked, whereby the phases and the amplitudes of reflected waves generated on the surfaces (interfaces) of the films are adjusted and interfered with each other so as to reduce reflected light. However, although the multilayer film may exhibit high anti-reflection properties with respect to light beam of the wavelength and the incidence angle used in the design phase, it is difficult for the multilayer film to maintain high anti-reflection properties over a wide wavelength band and a wide incidence angle. Thus, an anti-reflection film with a sub-wavelength structure for maintaining high anti-reflection properties over such a wide wavelength band or a wide incidence angle is known. Japanese Patent Laid-Open No. 2005-157119 discloses an optical system in which at least one or more optical surfaces of an optical element has a fine concave-convex feature (fine concave-convex periodic structure) having a cycle shorter than that of the visible light wavelength.

However, in the optical system disclosed in Japanese Patent Laid-Open No. 2005-157119, there is no description of a method for assembling a lens (optical element) having a fine concave-convex feature to a barrel within the interior of the optical system. In general, for assembling a lens to a barrel, (1) a method using a thrust ring, (2) a method by caulking, (3) a method using adhesive, or the like is used. Here, in the method (1) or (2), pressure (stress) is locally applied to a lens. Consequently, the lens is distorted, resulting in deterioration of the imaging performance of the optical system. A lens of which the central thickness is smaller than the outer diameter thereof by a factor of ten or more is particularly affected by such pressure (stress). On the other hand, in the method (3), the adverse effect of pressure is suppressed by selecting an appropriate adhesive (resin) having a small curing shrinkage ratio, resulting in no occurrence of lens distortion. However, when an adhesive is used, the components contained therein such as a solvent or a monomer may be evaporated or blown away depending on the type of the adhesive. Hence, when such adhesive is used in a sealed space such as the interior of a barrel, a lens may be fogged after being assembled, resulting in deterioration of anti-reflection properties. Since a fine concave-convex structure, a porous film, and the like have a very large surface area, they are particularly and readily affected by such phenomenon as compared with a normal dielectric thin film having a flat optical surface.

SUMMARY OF THE INVENTION

Accordingly, the present invention provides an optical system and a barrel that suppress the reduction in imaging performance and exhibit excellent environmental resistance.

According to a first aspect of the present invention, an optical system having at least two or more lenses is provided wherein at least one of the lenses comprises an anti-reflection film formed by a wetting method on a part of or the entirety of the light beam effective surface thereof, and wherein at least one of the lenses other than the lens comprising the anti-reflection film is fixed to the space between the lens and a barrel for holding the lens via an energy-curable resin to be filled therein.

According to a second aspect of the present invention, a barrel that holds a first lens and a second lens is provided, wherein the second lens comprises an anti-reflection film having a fine concave-convex feature on a part of or the entirety of the light beam effective surface thereof, the first lens is fixed to the barrel via an energy-curable resin which is an epoxy-type UV-curable resin or a UV-curable resin containing the epoxy-type UV-curable resin, and the anti-reflection film having the fine concave-convex feature and the energy-curable resin are disposed inside a communicating space.

According to the present invention, an optical system and a barrel that suppress the reduction in imaging performance and exhibit excellent environmental resistance may be provided.

Further features of the present invention will become apparent from the following description of exemplary embodiments with reference to the attached drawings.

DESCRIPTION OF THE EMBODIMENTS (First Embodiment)

Figure 1:
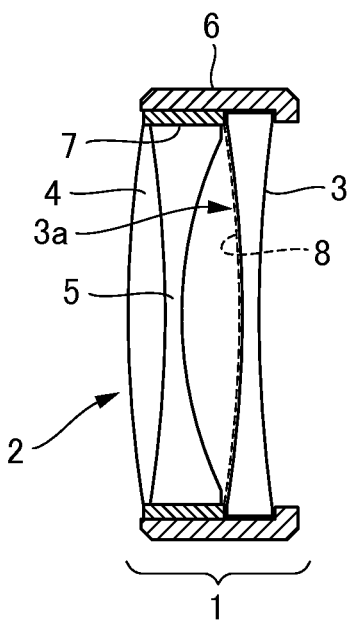
FIG. 1 is a cross-sectional view illustrating the configuration of an optical system according to a first embodiment of the present invention.
Figure 6:
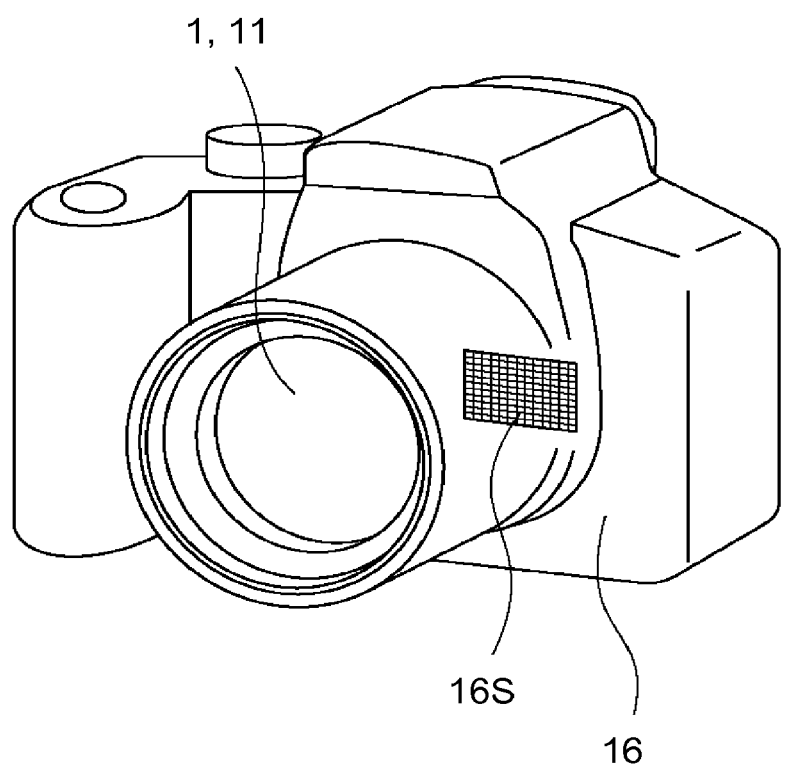
FIG. 6 schematically illustrates an imaging apparatus (camera) with the optical system.

Firstly, a description will be given of an optical system according to a first embodiment of the present invention. FIG. 1 is a schematic cross-sectional view illustrating the configuration of an optical system 1 according to the first embodiment of the present invention. The optical system 1 is a lens (optical element) unit provided in an imaging apparatus such as a camera 16 or the like with an imaging sensor 16S (see FIG. 6), or a focusing optical system constructed inside a lens barrel. The optical system 1 has at least two or more lenses arranged in the optical-axis direction. In particular, in the present embodiment, the optical system 1 includes a first lens 2 which is a joined lens and a second lens 3 having an anti-reflection film in sequence from the side where light is incident.

The first lens 2 consists of a double-convex lens 4 on the light entrance side and a double-concave lens 5 on the light exit side, which are joined together. For example, the double-concave lens 5 has a lens outer diameter "D" of 33 mm, and a central thickness "t" of 1.6 mm (t/D=0.048). The first lens 2 inside of a barrel 6 is fixed to the inner periphery portion of the barrel 6 via an energy-curable resin 7. With this arrangement, a force applied to the first lens 2 becomes very small upon fixation, and thus, there is no distortion of the first lens 2 having the value of t/D of 0.1 or less, which is distorted if the first lens 2 is fixed to a barrel using a thrust ring or by caulking. Consequently, a good imaging performance may be realized.

The second lens 3 is a double-concave lens having the outer diameter "D" of 34 mm and the central thickness "t" of 2.1 mm (t/D=0.062). The second lens 3 inside of the barrel 6 is directly fixed to the inner periphery portion of the barrel 6 while being adjacent to the first lens 2. The second lens 3 further includes an anti-reflection film on a part of or the entirety of the surface of the light beam effective surface thereof. In particular, in the present embodiment, the second lens 3 includes an anti-reflection film 8 (broken line in FIG. 1) on the entirety of a concave surface 3a on the light entrance side of the second lens 3. The anti-reflection film 8 has a fine concave-convex feature which is formed by applying sol solution containing aluminum oxide to the concave surface 3a prior to the formation of the anti-reflection film 8 by spin-coating and immersing it in warm water after sintering. As described above, the anti-reflection film 8 formed by a wetting method can favorably suppress the occurrence of unwanted light such as flares or ghost.

Figure 2:
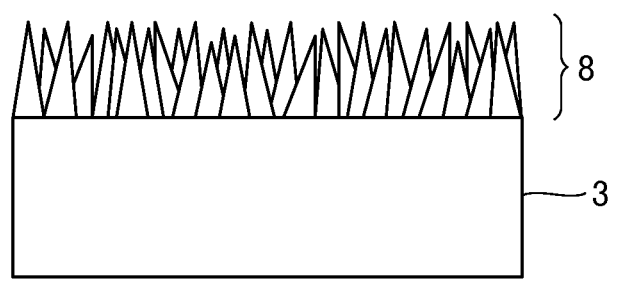
FIG. 2 is a cross-sectional view illustrating the structure of an anti-reflection film according to the first embodiment.

FIG. 2 is a schematic cross-sectional view illustrating the configuration of the anti-reflection film 8. The anti-reflection film 8 is a concave-convex structure consisting of an aluminum oxide-containing material, which is formed by the wetting method as described above on the surface of the second lens 3. It is preferable that the concave-convex structure has an average pitch of 400 nm or less and an average height of 200 nm or more. This is because unwanted light for the optical system 1 is generated by the diffraction of visible light if the average pitch is set to be greater than 400 nm, whereas sufficient anti-reflection properties may not be obtained if the average height is set to be 200 nm or less.

Figure 3A:
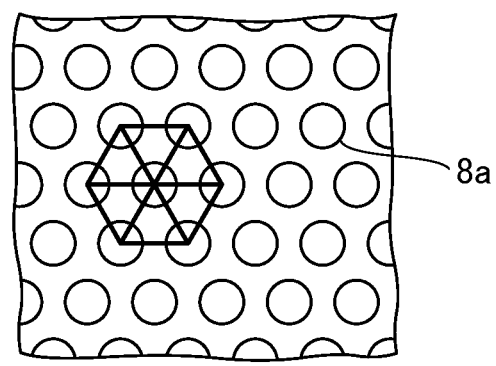
FIG. 3A is a plan view illustrating an average pitch.
Figure 3B:
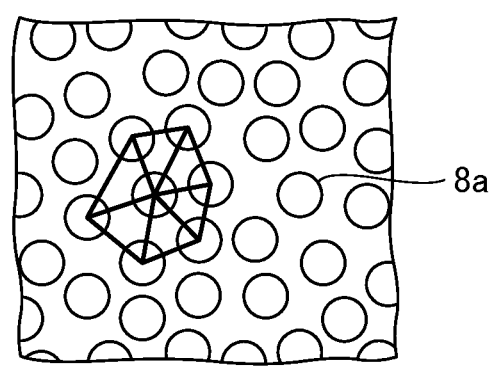
FIG. 3B is a plan view illustrating an average pitch.

Here, a description will be given of the average pitch, the average height, and their definition according to the present embodiment. FIGS. 3A and 3B are plan views illustrating a concave-convex structure as viewed from the top (in the present embodiment, the light entrance side). In particular, FIG. 3A shows a periodically arranged concave-convex structure and FIG. 3B shows an aperiodically arranged concave-convex structure. In FIGS. 3A and 3B, the shape of a convex and concave portion 8a constituting the concave-convex structure in plan views is a circle for schematic explanation. Firstly, when the concave-convex structure is periodically arranged in a triangular lattice form as shown in FIG. 3A, the average pitch can be defined as being equal to the interval between a convex and concave portion 8a and another convex and concave portion 8a adjacent thereto. In contrast, when the concave-convex structure is aperiodically arranged as shown in FIG. 3B, the average pitch can be defined using the following method. Firstly, a plurality of (six in FIG. 3B) convex and concave portions 8a is selected in order near a convex and concave portion 8a, the average value of their respective intervals from the convex and concave portion 8a of reference is calculated. Next, the average values for all the plurality of (six) convex and concave portions 8a are calculated in a similar manner. Finally, the average pitch is determined by averaging these average values again. Measuring all the average pitches for the concave-convex structure formed on the optical surface (the concave surface 3a of the second lens 3) is substantially difficult in the present embodiment. Thus, the average pitch may also be obtained by observing and measuring the optical surface at one or several points using, for example, a SEM (scanning electron microscope). Next, the average height may be obtained by measuring and averaging the heights of all the convex and concave portions 8a using, for example, a SPM (scanning probe microscope). Also in this case, the average height may be obtained by observing and measuring the optical surface at one or several points.

Next, a description will be given of the energy-curable resin 7 employed for holding the first lens 2. As the energy-curable resin 7 of the present embodiment, an epoxy-type UV-curable resin is employed. Note that a UV-curable resin is a resin that is cured by receiving ultraviolet light. The epoxy-type UV-curable resin contains 30% by weight of an epoxy resin and 1% by weight of silica. Here, the epoxy-type UV-curable resin does not contain acrylate monomers and methacrylate monomers as components. When the epoxy-type UV-curable resin is filled into the space between the first lens 2 and the barrel 6, there is no or little component to be evaporated and blown away. Thus, even when the epoxy-type UV-curable resin is used in a space which communicates with the anti-reflection film 8 having a fine concave-convex feature, there is no adverse effect on the anti-reflection properties of the anti-reflection film 8 having a fine concave-convex feature by fogging, which is also advantageous for environmental resistance. Furthermore, the viscosity of the uncured epoxy-type UV-curable resin is 26 Pa·s, which is also advantageous for facilitating operation required when the uncured epoxy-type UV-curable resin is filled into the space using a dispenser (coating device) or the like.

Note that the energy-curable resin 7 is not limited to the epoxy-type UV-curable resin as described above. For example, the same effects can be obtained as long as the epoxy-type UV-curable resin contains 10% by weight or more of an epoxy resin. Although silica is not an essential material, it is preferable that 0.5% by weight or more of silica be contained in the epoxy-type UV-curable resin in order to enhance the strength of the cured resin. In particular, in the present embodiment, it is important that the epoxy-type UV-curable resin does not contain acrylate monomers as described above. When the content of any component contained in the epoxy-type UV-curable resin is changed, it is preferable that the viscosity of the uncured resin be in a range from 1 Pa·s to 50 Pa·s. This is because the resin may be permeated into places other than the desired place and the light beam effective surface of the first lens 2 is contaminated thereby if the viscosity of the uncured resin is 1 Pa·s or less, whereas the dispenser cannot discharge the resin in a stable manner if the viscosity of the uncured resin is 50 Pa·s or greater and the tip of the outlet portion of the dispenser is thin.

As described above, according to the optical system of the present embodiment, a lens can be fixed inside a barrel without causing distortion of the lens, and thus, the reduction in imaging performance may be suppressed. Furthermore, since an energy-curable resin containing no or little component to be evaporated and blown away is filled into the space between a lens and a barrel for holding the lens, an optical system that suppresses the influence of the resin on an anti-reflection film and exhibits excellent environmental resistance may be provided.

(Second Embodiment)

Figure 4:
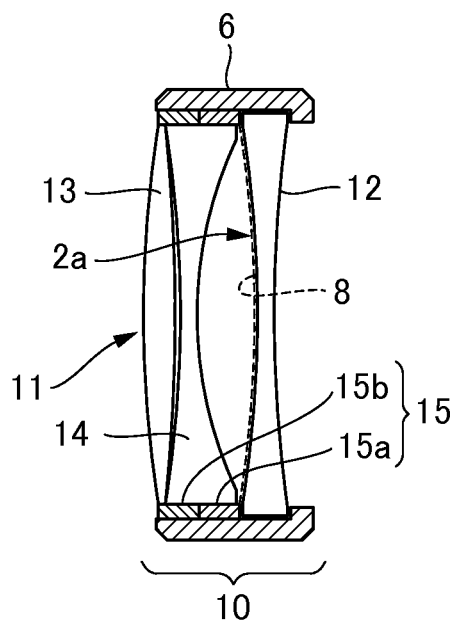
FIG. 4 is a cross-sectional view illustrating the configuration of an optical system according to a second embodiment of the present invention.

Next, a description will be given of an optical system according to a second embodiment of the present invention. In the first embodiment, an epoxy-type UV-curable resin is used singularly as an energy-curable resin, whereas a feature of the optical system of the present embodiment lies in the fact that an epoxy-type UV-curable resin and acrylic UV-curable resin are used in combination as an energy-curable resin. FIG. 4 is a schematic cross-sectional view illustrating the configuration of the optical system 10 according to the present embodiment. As in the first embodiment, the optical system 10 has at least two or more lenses arranged in the optical-axis direction. The optical system 10 includes a first lens 11 which is a combination of two lenses and a second lens 12 having an anti-reflection film in sequence from the side where light is incident. As in the second lens 3 of the first embodiment, the second lens 12 of the present embodiment is a double-concave lens having the lens outer diameter "D" of 38 mm and the central thickness "t" of 1.7 mm (t/D=0.045). The anti-reflection film 8 formed on the second lens 12 also has a fine concave-convex feature as in the first embodiment.

The first lens 11 consists of a double-convex lens 13 on the light entrance side and a double-concave lens 14 on the light exit side, which are adjacent to each other. For example, the double-concave lens 14 has a lens outer diameter "D" of 37 mm and a central thickness "t" of 1.8 mm (t/D=0.049). The first lens 11 inside of the barrel 6 (as in the first embodiment) is fixed to the inner periphery portion of the barrel 6 via an energy-curable resin portion 15 constituted by two resin layers. In particular, in the present embodiment, the energy-curable resin portion 15 is constituted by a first layer 15a consisting of an epoxy-type UV-curable resin and a second layer 15b consisting of an acrylic UV-curable resin which are filled into the space between the first lens 11 and the barrel 6 so as to be adjacent to each other. At this time, the first layer 15a is arranged on the side of the second lens 12, and the second layer 15b is spatially sealed from the anti-reflection film formed on the second lens 12. With this arrangement, as in the first embodiment, a force applied to the first lens 11 becomes very small upon fixation, and thus, there is no distortion of the first lens 11 having the value of t/D of 0.1 or less, which is distorted if the first lens 11 is fixed to a barrel using a thrust ring. Consequently, a good imaging performance may be realized.

Here, it is preferable that the first layer 15a contains 40% by weight of an epoxy resin. As in the first embodiment, the first layer 15a does not contain acrylate monomers and methacrylate monomers as components. Thus, also in the present embodiment, when the resin is filled into the space between the first lens 11 and the barrel 6, there is no or little component to be evaporated and blown away. Thus, there is no adverse effect on the anti-reflection properties of the anti-reflection film 8 by fogging, which is also advantageous for environmental resistance. Furthermore, the viscosity of the uncured epoxy-type UV-curable resin is 35 Pa·s, which is also advantageous for facilitating operation required when the uncured epoxy-type UV-curable resin is filled into the space using a dispenser or the like. Note that the first layer 15a is not limited to the epoxy-type UV-curable resin as described above. For example, the same effects can be obtained as long as the first layer 15a contains 10% by weight or more of an epoxy resin. In particular, also in the present embodiment, it is important that the epoxy-type UV-curable resin does not contain acrylate monomers. When the content of any component contained in the epoxy-type UV-curable resin is changed, it is preferable that the viscosity of the uncured resin be in a range from 1 Pa·s to 50 Pa·s.

Since the toughness of the cured epoxy-type UV-curable resin constituting the first layer 15a is low and fragile, the second layer 15b has a role in preventing the first lens 11 from being shifted and disengaged when external shock or vibration is applied to the optical system 10. However, since the second layer 15b contains acrylate monomers, there may be a component to be evaporated and blown away when the second layer 15b is filled into the space between the first lens 11 and the barrel 6. Thus, in the present embodiment, the second layer 15b is spatially sealed from the anti-reflection film formed on the second lens 12 via the first layer 15a as described above, and thus, no volatile component enters toward the anti-reflection film. The viscosity of the uncured acrylic UV-curable resin is 15 Pa·s, which is also advantageous for facilitating operation required when the acrylic UV-curable resin is filled into the space using a dispenser or the like. For the second layer 15b, the same effects may be obtained when another resin having a high toughness and a small curing shrinkage ratio such as a silicone UV-curable resin or the like is used instead of an acrylic UV-curable resin.

As described above, according to the present embodiment, the same effects as those in the first embodiment may be obtained, and an optical system exhibiting excellent environmental resistance may be provided.

Figure 5:
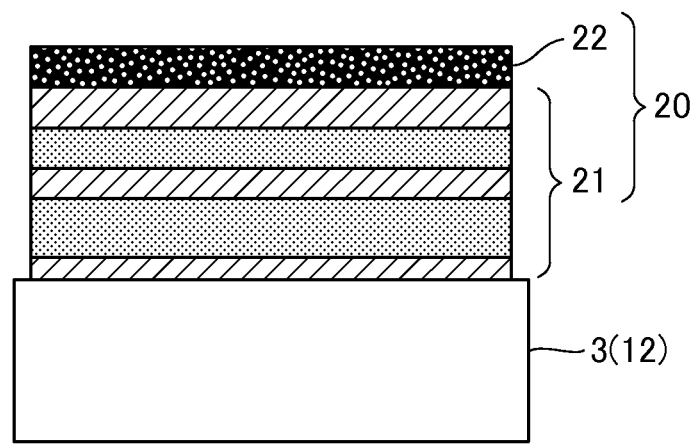
FIG. 5 is a cross-sectional view illustrating the structure of an anti-reflection film according to another embodiment.

The configuration of the anti-reflection film 8 and its forming method may be any as long as the anti-reflection film 8 is formed by a wetting method. A specific method is not limited to the methods described in the embodiments. As another example of wetting method, sol solution containing fluoride microparticles, hollow silica microparticles, and the like is applied on a dielectric thin film formed by a vapor deposition method, and the resulting dielectric thin film is dried to thereby form a porous film having a low refractive index. FIG. 5 is a schematic cross-sectional view illustrating the structure of an anti-reflection film 20 in this case. The anti-reflection film 20 is a film in which a dielectric thin film 21 formed by a vapor deposition method is formed on the surface of the second lens 3 (12), and a porous low refractive index film 22 having "$n_d$" of 1.3, which contains fluoride microparticles and is formed using a wetting method, is further formed on the dielectric thin film 21. As described above, the Fresnel reflectance may be reduced by reducing the refractive index of the uppermost film as compared with the refractive index of a film formed by a normal vapor deposition method, and thus, a high-performance anti-reflection film may be realized.

In the embodiments, a description has been given under the assumption that an energy-curable resin is used for the fixation of one of two lenses constituting an optical system to a barrel. However, the present invention is not limited thereto. For example, when the number of lenses constituting an optical system is many, an energy-curable resin may also be used for the fixation of one or more lenses other than a lens including an anti-reflection film to a barrel.

Furthermore, in the embodiments, a description has been given under the assumption that an optical system 1, 11 is used for an imaging apparatus such as a camera 16 as a focusing optical system. However, the optical system of the present invention may be used for any optical instrument as an observing optical system such as a telescope or binoculars or a scanning optical system.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-097767 filed on Apr. 26, 2011 which is hereby incorporated by reference herein in its entirety.

What is claimed is:

1. An optical system comprising:
   a plurality of optical elements including a first lens and a second lens; and
   a barrel configured to hold the plurality of optical elements,
   wherein the second lens includes an anti-reflection film formed on an optical surface thereof,
   wherein the first lens is fixed to the barrel via an energy-curable resin,
   wherein the energy-curable resin includes a first layer consisting of an epoxy-type UV-curable resin and a second layer consisting of an acrylic UV-curable resin or a silicone UV-curable resin adjacent to the first layer in an optical-axis direction, and
   wherein the first layer is disposed on a side of the second lens in the optical-axis direction.

2. The optical system according to claim 1, wherein the epoxy-type UV-curable resin contains 10% by weight or more of an epoxy resin.

3. The optical system according to claim 2, wherein the epoxy-type UV-curable resin contains 0.5% by weight or more of silica.

4. The optical system according to claim 3, wherein the viscosity of an uncured epoxy-type UV-curable resin is in a range from 1 Pa·s to 50 Pa·s.

5. The optical system according to claim 1, wherein the second layer comes into contact with the barrel.

6. The optical system according to claim 1, wherein the anti-reflection film is formed by a wetting method.

7. The optical system according to claim 1, wherein the anti-reflection film has a fine concave-convex profile having an average pitch of 400 nm or less.

8. The optical system according to claim 7, wherein the anti-reflection film contains aluminum oxide.

9. The optical system according to claim 1, wherein the anti-reflection film contains fluoride microparticles or hollow silica microparticles.

10. The optical system according to claim 1, wherein:
    the first lens is composed of lenses, including a concave lens, joined with each other or adjoin each other, and
    wherein a value of t/D is 0.1 or less,
        where "D" represents an outer diameter of the concave lens and "t" represents a central thickness thereof.

11. An optical instrument comprising:
    a camera; and
    an optical system comprising:
        a plurality of optical elements including a first lens and a second lens; and
        a barrel configured to hold the plurality of optical elements,
        wherein the second lens includes an anti-reflection film formed on an optical surface thereof,
        wherein the first lens is fixed to the barrel via an energy-curable resin,
        wherein the energy-curable resin includes a first layer consisting of an epoxy-type UV-curable resin and a second layer consisting of an acrylic UV-curable resin or a silicone UV-curable resin adjacent to the first layer in an optical-axis direction, and
        wherein the first layer is disposed on a side of the second lens in the optical-axis direction.

12. The optical system according to claim 1, wherein the first layer is disposed between the second layer and the anti-reflection film so that the second layer is spaced from the anti-reflection film.

13. The optical system according to claim 12, wherein the energy-curable resin does not contain acrylate monomers and methacrylate monomers.

14. The optical system according to claim 1, wherein the first lens and the second lens are arranged adjacent to each other.

* * * * *